Patent page

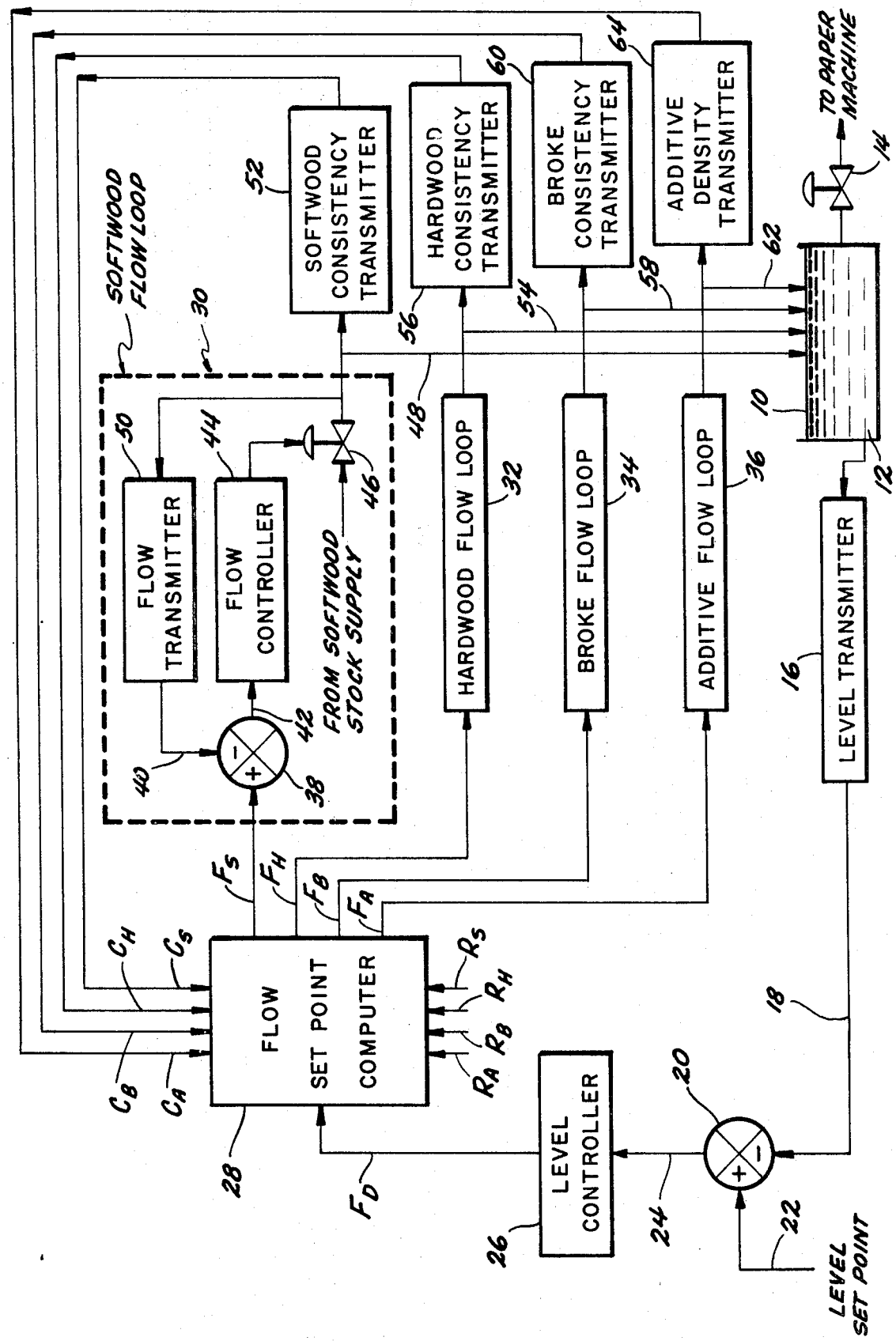

United States Patent Office

3,572,361
Patented Mar. 23, 1971

---

3,572,361
APPARATUS FOR BLENDING STOCK FOR A PAPER MACHINE
Robert J. Terhar and Ronald E. Knoerzer, Beloit, Wis., Marion A. Keyes, South Beloit, Ill., and Robert A. Beachler, Beloit, Wis., assignors to Beloit Corporation, Beloit, Wis.
Filed Aug. 28, 1968, Ser. No. 755,904
Int. Cl. G05d 11/035
U.S. Cl. 137—92                                                         5 Claims

ABSTRACT OF THE DISCLOSURE

An apparatus in which a plurality of stock materials are blended to provide the furnish to a paper machine. A consistency measuring device for each stock material along with a level controller for the furnish blending tank provide signals to a computer which determines desired flow rates for the various stocks. Controllers then regulate the flow rate to the blending tank for each stock in response to the computed flow rate.

BACKGROUND OF THE INVENTION

(1) Field of the invention

This invention relates generally to paper making, and pertains more particularly to a method and system for blending stocks and additives.

(2) Description of the prior art

Previous blending methods and systems have proportioned the various component materials on a volumetric basis. In other words, what has been measured in the past has been the amount of each fluid volume of stock or pulp entering the blend chest. Such methods and systems have relied upon constant consistencies and have been insensitive to consistency variations. Consequently, the resulting furnish has not been of the required composition in the presence of such variations. Since different stock constituents or components can differ widely as to price, the prior art methods and systems have been disadvantageous as to quality and cost.

SUMMARY OF THE INVENTION

One object of the present invention is to provide a method and system for precisely controlling the blend of the various fluid stocks and additives, doing so on a bone dry or moisture-free basis. In this way, the present invention avoids the shortcomings experienced in earlier systems.

Briefly, the present invention calculates what the fluid flow should be for each stock and additive and then controls the actual flow rates so that the required amount of each stock constituent and additive enter the mixing tank. In calculating the set points that represent the proper flow rates, compensation is made for any variation in consistency, thereby controlling the individual flows of stocks and additives on a bone dry mass basis rather than on a volumetric basis.

BRIEF DESCRIPTION OF THE DRAWING

The single figure constituting the drawing exemplifies our invention in block form.

DESCRIPTION OF THE PREFERRED EMBODIMENT

Referring now in detail to the drawing, a conventional blend chest 10 has been schematically presented. As is customary the blend chest contains the furnish 12 which is agitated and then delivered through an outlet 14 to the paper machine (not shown). It will be appreciated that the furnish 12 may pass through mixed stock refiners and other equipment before reaching the headbox from which the furnish or mixed stock is delivered onto a Fourdrinier wire.

To maintain reasonable operating conditions, the level in the blend chest 10 must be maintained within desired limits. Accordingly, a level transmitter 16 senses the pressure near the bottom of the chest 10 to provide a signal indicative of the tank level. This signal is forwarded over a line 18 to a summing junction or comparator 20. The comparator 20 compares the actual level signal with a desired level signal or set point supplied by a line 22. Any difference between the two input signals produces an error or output signal having a value representative of the difference and by means of a line 24 this error signal is delivered to a level controller 26 for further processing. The line from the controller 26 will be labeled $F_D$ and the signal carried thereby will be referred to as $F'_D$ in conjunction with certain equations hereinafter discussed. The signal $F'_D$ provided by the controller 26 is indicative of the demanded flow rate (gallons per minute) needed to maintain the proper level of furnish 12 in the blend chest 10. The signal $F'_D$ is fed over the line $F_D$ to a flow set point computer 28.

At this time it will be assumed that the fiber stock materials to be blended constitute softwood, hardwood and broke and that the additive material constitutes alum. It will be recognized, though, that these ingredients are only suggestive and that the number could be readily increased or decreased. As with the demanded flow $F'_D$ it will be helpful to use letter subscripts. Accordingly, the output lines for the various set points to be calculated by the computer 28 will be designated as $F_S$ (softwood), $F_H$ (hardwood), $F_B$ (broke) and $F_A$ (additive) and the set point signals themselves as $F'_S$, $F'_H$, $F'_B$ and $F'_A$, respectively. The manner in which these signals are determined is very important as they control the actual fluid flow rates of the fluid stock entering the blend chest 10.

Although the means for obtaining signals indicative of the consistency of each fluid stock or pulp have not been referred to, nonetheless these signals can be considered as $C'_S$, $C'_H$, $C'_B$ and $C'_A$ which are entered into the computer 28 via input lines $C_S$, $C_H$, $C_B$ and $C_A$.

Also, since the desired composition of the furnish 12 will be known for a given type or grade of paper, the ratios of the various constituents or ingredients can be predetermined in relation to the total. Since in the past volumetric ratios have been selected that include only fiber stocks, this procedure will herein be adhered to. Hence, the stock ratios will be based on the amount of each bone dry fiber constituent to the total and the additive as a ratio with respect to the total (or any single constituent) of these fiber constituents. Since three fiber stock materials have been selected, the several signals representing the desired ratios can be referred to as $R'_S$, $R'_H$ and $R'_B$, being fed into the computer 28 over input lines $R_S$, $R_H$ and $R_B$. By the same token, the ratio of additive signal $R'_A$ is entered by way of line $R_A$.

Although more information will be given concerning the derivation of the signals $C'_S$, $C'_H$, $C'_B$ and $C'_A$, it is believed that the equations solved by the computer 28 can now be listed:

$$F'_D C'_T = C'_S F'_S + C'_H F'_H + C'_B F'_B$$

$$R'_S = \frac{C'_S F'_S}{C'_S F'_S + C'_H F'_H + C'_B F'_B}$$

$$R'_H = \frac{C'_H F'_H}{C'_S F'_S + C'_H F'_H + C'_B F'_B}$$

$$R'_B = \frac{C'_B F'_B}{C'_S F'_S + C'_H F'_H + C'_B F'_B}$$

$$R'_A = \frac{C'_A F'_A}{C'_S F'_S + C'_H F'_H + C'_B F'_B}$$

In summary:

$F'_D$ will be known because it represents the demand flow from the level controller 26;

$C'_S$, $C'_H$, $C'_B$ and $C'_A$ will be known because they represent actual consistency data;

$R'_S$, $R'_H$, $R'_B$ and $R'_A$ will be known because these are ratios selected on the basis of what is wanted in the furnish;

$C_T$ is unknown but is capable of being solved for because it represents an overall consistency factor derivable from $C'_S$, $C'_H$ and $C'_B$, and $F'_S$, $F'_H$, $F'_B$ and $F'_A$ are unknown but are solved for in order to provide the selected ratios $R'_S$, $R'_H$, $R'_B$ and $R'_A$.

In essence, the computer 28 determines what the values for $F'_S$, $F'_H$, $F'_B$ and $F'_A$ should be and provides set points in accordance with these values such that the respective stock and additive fluid rates of flow are controlled to deliver the proper quantities of bone dry ingredients to the blend chest 10 as will now be explained.

Since we have somewhat arbitrarily selected three stock constituents and one additive, four flow control loops will be required under these circumstances. Therefore, there is a softwood flow control loop 30, a hardwood flow control loop 32, a broke flow control loop 34 and an additive flow control loop 36. Since these loops 30, 32, 34 and 36 contain identical components, a detailed description of only one loop should suffice. Therefore, taking the softwood flow loop as an example, it will be discerned that a summing junction or comparator 38 has one of its input points connected to the set point line $F_S$ so as to receive the calculated set point signal $F'_S$. The signal $F'_S$ represents a desired flow of fluid stock or pulp containing softwood as the constituent. A line 40 supplies a signal representative of the actual fluid stock flow. The difference sensed by the comparator 38 is forwarded as an error signal over a line 42 to a flow controller 44 which positions a control valve 46 so as to pass the proper amount of fluid stock obtained from a batch-type softwood stock supply source. The valve 46 adjusts the fluid stock flow through a pipe or conduit 48 which discharges into the blend chest 10.

A flow transmitter 50 provides a feedback signal in accordance with the actual flow rate through the valve 46, this being the signal to the comparator 38 that is compared with the desired signal or set point $F'_S$. It is the difference between these two signals that appears as an error signal on the line 42 leading to the flow controller 44 which in turn functions to position the valve 46.

The consistency of the actual fluid stock flow is ascertained by an appropriate consistency transmitter 52 and the resulting signal $C'_S$ is fed to the computer 28 via line $C_S$. It is important to appreciate that the data entered into the computer 28 is representative of the consistency that actually exists in the stock suspension or pulp and that the flow is adjusted by the valve 46 to compensate for consistency variations. If the consistency varies higher than original value, the valve 46 will be closed more; if the consistency varies lower than original value, the valve 46 will be opened more. The result is that the fiber mass rate of flow is held constant. Stated somewhat differently, the softwood is delivered to the blend chest on a bone dry mass basis even though it is contained in a wet slurry.

As already indicated the other flow loops 32, 34 and 36 operate in an identical fashion to the loop 30. Hence, the actual fluid stock flow from the loop 32 flows through a pipe 54 and its consistency is determined by a consistency transmitter 56 to provide a signal $C'_H$ that is introduced into the computer by line $C_H$. Likewise, the loop 34 causes its fluid stock to flow through a pipe 58 and the consistency signal $C'_B$ is delivered to the computer over the line $C_B$. By the same token, the loop 36 adjusts the additive flow through a pipe 62 and the consistency (density) thereof is sensed by the transmitter 64 to deliver the entry $C'_A$ over the line $C_A$ to the computer 28.

The desirability of supplying stock components on a bone dry basis to the blend chest 10 cannot be emphasized too strongly. By compensating for fluctuations or differences in the consistency of each stock pulp and additive or at least the major ones, a truly accurate blend is reflected in the furnish 12. It will be recognized that various factors contribute to the lack of a uniform consistency in any given stock flow which heretofore have adversely affected the composition of the furnish. For instance, stock pulp is usually prepared in batches and the consistency will vary from batch to batch for a given stock or additive.

We claim:

1. Apparatus for blending stock for a paper machine comprising means for supplying a plurality of stock components in fluid form to a mixing tank, means for determining the consistency of each fluid stock as it flows to said tank, means for computing set point signals representing the desired flow rates of each fluid stock component, and respective means for individually adjusting the flow rate of each of said fluid stock components entering said mixing tank in response to the set point signal therefore.

2. The apparatus of claim 1 including means for determining the demand for fluid stock required by said tank to provide a first signal repersentative thereof, means for providing a plurality of second signals representative of the ratio of each desired stock component to the total of such components, said means for determining the consistency of each fluid stock as it flows to said tank providing a plurality of third signals representing the respective stock consistencies, and said computing means computing set point signals from said first, second and third signals representing the deired flow rates of each fluid stock component that will result in the realization of said ratios.

3. The apparatus of claim 2, in which said adjusting means includes a flow control loop for each fluid stock, each control loop including a flow transmitter for providing a feedback signal indicative of the actual rate of fluid flow and comparator means for comparing said feedback signal with the set point signal representing the desired flow rate for a particular stock, said adjustment means being responsive to the difference between the set point and feedback signals for each loop.

4. Apparatus for blending stock for a paper machine comprising a blend chest containing furnish composed of different fluid stocks delivered thereto, means providing a signal representative of the actual level of the furnish in said chest, means comparing said actual level signal with a desired level signal to provide an error signal, a level controller responsive to said error signal for supplying a signal representative of the demanded flow required to said blend chest, a set point computer connected to said level controller, said demanded flow signal serving as one input signal thereto, means for supplying additional input signals to said computer, each additional signal being representative of a ratio of one stock component to the total of stock components, means for providing further input signals to said computer, each further signal being representative of the consistency of a particular fluid stock being delivered to said blend chest, said computer calculating a desired flow signal for each stock component, and a flow control loop responsive to each desired flow signal for controlling the rate of flow for its particular fluid stock in accordance therewith.

5. The apparatus of claim 4 in which each loop includes a comparator, a flow transmitter providing a feedback signal indicative of the actual rate of flow of a fluid stock, said comparator comparing the desired flow signal from the computer with the feedback signal to provide an error signal, a flow controller responsive to said error signal, and a valve positioned by said flow controller for adjusting the rate of fluid stock flow in accordance with the error signal received by said flow controller.

References Cited

UNITED STATES PATENTS

| | | | |
|---|---|---|---|
| 3,271,241 | 9/1966 | Mumme | 162—380 |
| 3,415,264 | 12/1968 | Brown et al. | 137—92 |
| 3,490,689 | 1/1970 | Hart et al. | 162—252 |

S. LEON BASHORE, Primary Examiner

T. G. SCAVONE, Assistant Examiner

U.S. Cl. X.R.

137—389; 162—253, 254, 258, 263, 380